United States Patent [19]

Mandel et al.

[11] Patent Number: 4,861,150
[45] Date of Patent: Aug. 29, 1989

[54] IMAGE ROTATOR FOR ROTATING AN IMAGE NINETY DEGREES

[75] Inventors: Linda Mandel, 1392 S. Euclid, La Habra, Calif. 90631; Edward Ensign, Costa Mesa, Calif.

[73] Assignee: Linda Mandel, La Habra, Calif.

[21] Appl. No.: 208,294

[22] Filed: Jun. 10, 1988

[51] Int. Cl.$^4$ .......................... G02B 17/06; G02B 5/08
[52] U.S. Cl. .................................................. 350/622
[58] Field of Search ........................ 350/622, 618, 612

[56] References Cited

U.S. PATENT DOCUMENTS

| 4,103,991 | 8/1978 | Kramer | 350/622 |
| 4,354,733 | 10/1982 | Picquet et al. | 350/622 |
| 4,639,097 | 1/1987 | Teske et al. | 350/622 |

OTHER PUBLICATIONS

J. A. Holcombe, "An Inexpensive, Reflective, Image, Rotator", *Applied Spectroscopy*, vol. 32, No. 4, p. 405 (Jul.-Aug., 1978).
David A. Berkowitz, "Design of Plane Mirror Systems", *Jour. Opt. Soc. Am.* vol. 55, No. 11, pp. 1464–1467, Nov. 1965.
Sten Walles et al, "The Orientation of the Image formed by a Series of Plane Mirrors", *Appl. Opt.* vol. 3, No. 12, pp. 1447–1452, Dec. 1964.
Bernard S. Lee, "Oblique Reflecting Systems", *Jour. Opt. Soc. Am.*, vol. 39, No. 6, pp. 487–489, Jun. 1949.

*Primary Examiner*—Jon W. Henry
*Attorney, Agent, or Firm*—Charles H. Thomas

[57] ABSTRACT

An assembly including a plurality of mirrors is provided to optically rotate an image ninety degrees. A confining case holds the mirrors disposed end to end in a configuration of a right isosceles triangle. A window in registration with the first of the mirrors is oriented parallel to one leg of the triangle on the back side of the case, while a window in registration with a second of the mirrors is located along the other leg of the triangle on the front side of the case.

6 Claims, 2 Drawing Sheets

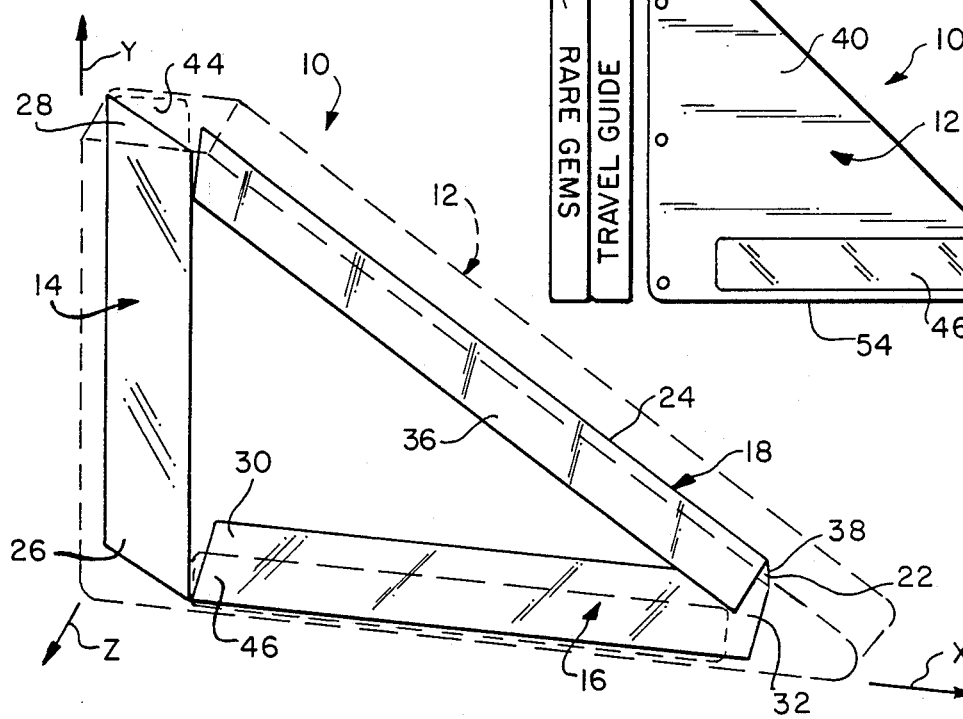
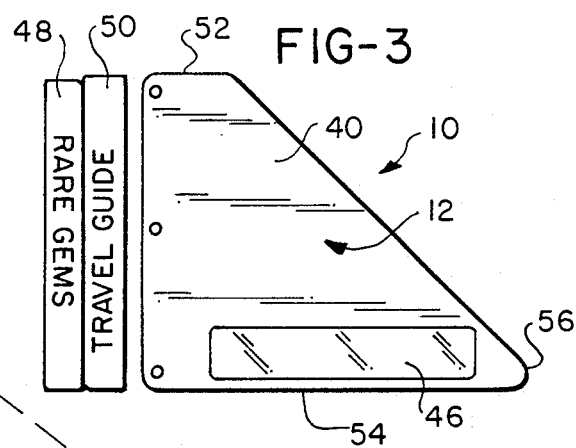
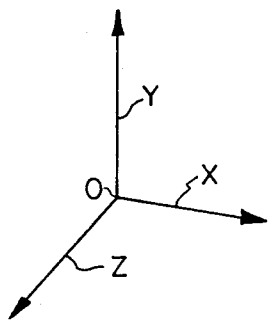
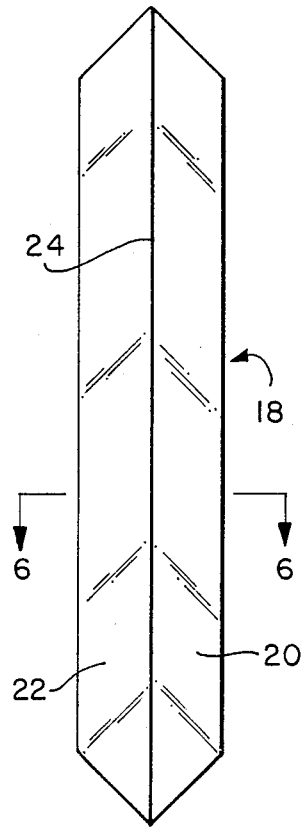
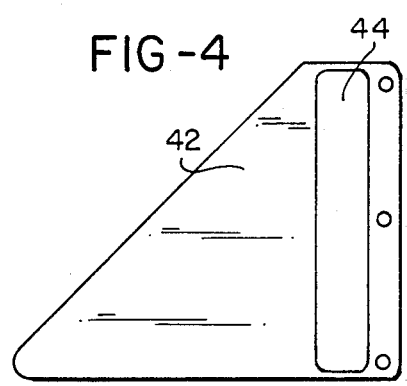
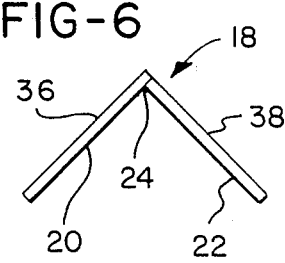

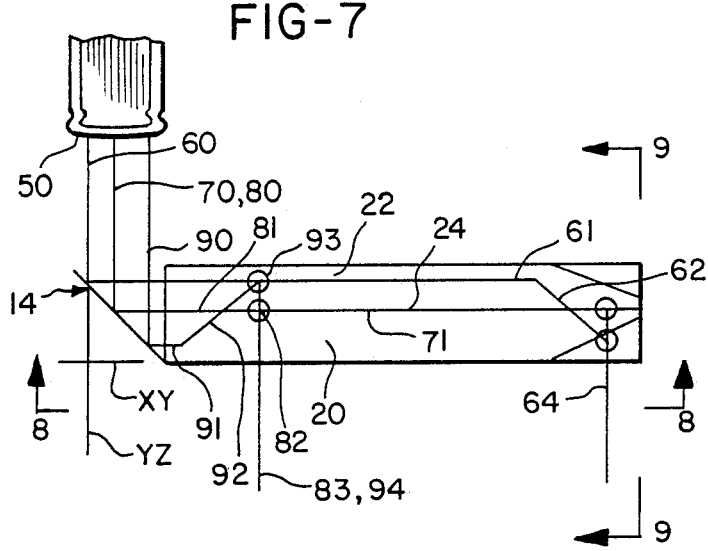
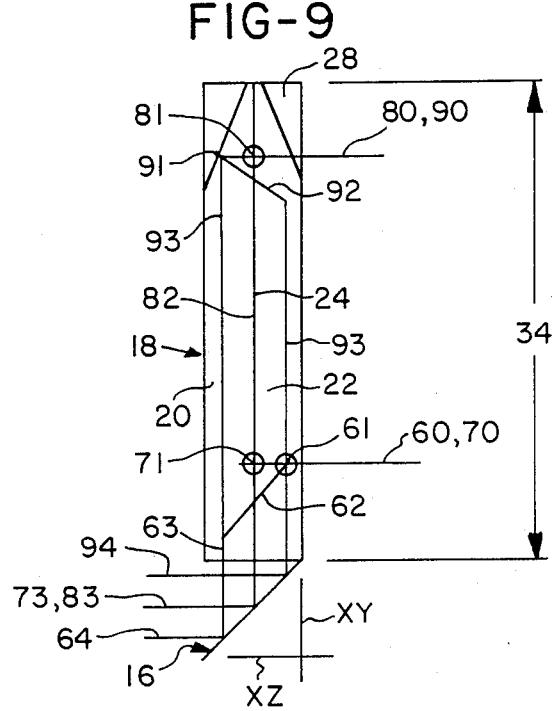
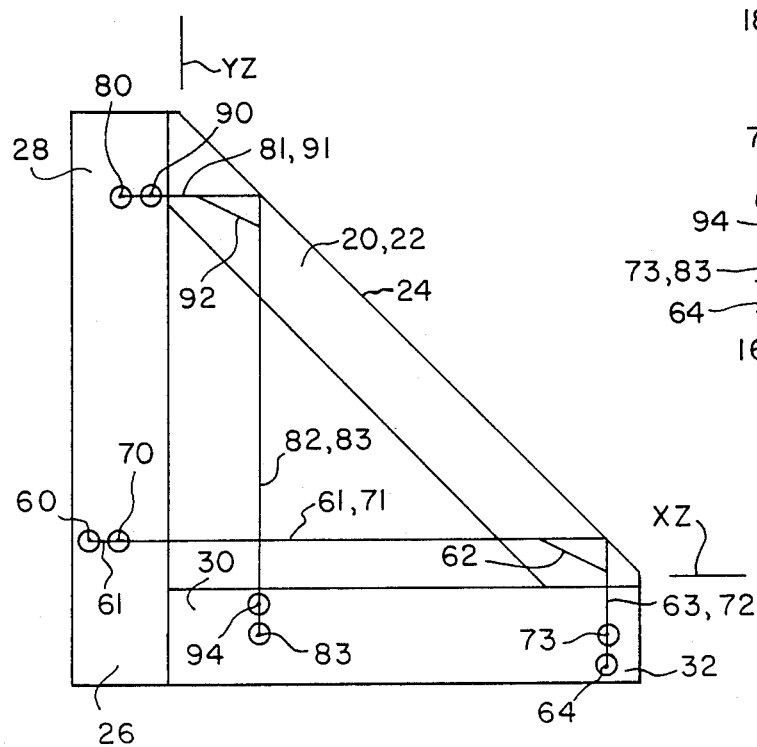

IMAGE ROTATOR FOR ROTATING AN IMAGE NINETY DEGREES

BACKGROUND OF THE INVENTION

1. Field of the Invention

The present invention relates to a device for optically rotating an image ninety degrees.

2. Description of the Prior Art

There are numerous different situations in which the ability to optically rotate an image by ninety degrees would be very useful. For example, the titles and authors of books are normally printed on the binding of books, and books are normally positioned upright on shelves of both public and private libraries. When stacked in this manner books are oriented in a vertical disposition, packed laterally together, so that a selected book may be withdrawn from between adjacent books with ease.

While some books are thick enough to allow the names of their titles and authors to be printed horizontally across the backs of the bindings when the books stand upright on library shelves, many books, indeed the great majority of books, are simply too thin to allow useful information to be printed on their bindings in this manner. Accordingly, it has been a frequent practice among book publishers to print names of authors and the titles of books lengthwise along the bindings of many books.

While information printed on book bindings in this manner can be read in the normal fashion with a lateral eye scan when the book is laid flat on a surface, the titles and authors become more difficult to read when the books are stacked on library shelves. The lettering on the book spines, instead of progressing horizontally from left to right so as to be easily read by the human eye, is tipped ninety degrees and progresses from either top to bottom or bottom to top. An individual seeking to read information from the spine of a book stacked in a library is therefore forced to tilt his or her head sideways to an extreme angle in order to be able to absorb the information printed on the book spine. Maintaining one's head in such a position to read information in such an awkward manner becomes quite tedious and uncomfortable.

SUMMARY OF THE INVENTION

An object of the present invention is to provide an image rotating device which may be utilized by an individual to optically rotate an image ninety degrees. This enables a person to scan information which has been turned ninety degrees from an orientation in which letters of words are read from left to right. The printing of letters from left to right within words is conventional for the most widely read languages in the world.

A related object of the invention is to provide an image rotating device for use in libraries which allows information printed longitudinally on the spines of books to be read without uncomfortably twisting one's head to facilitate comprehension. According to the invention the image rotating device is positioned with a first mirror facing the spine of a book in vertical disposition and in longitudinal alignment parallel to the spine of the book. The image of the printed material on the book spine is optically reflected within the image rotating device so that the information on the spine of the book can be read through a longitudinal, horizontal window in the image rotating device. This allows information on the book spine to be read without the discomfort of twisting one's head to the side.

A further object of the invention is to provide an image rotating device which can be utilized to rotate images ninety degrees in either direction. The device can thus be utilized to rectify the printing on the spines of books where the words on the spines are printed from either bottom to top or from top to bottom as the books stand upright on the shelves.

The image rotating device is disposed in one orientation to face the spine of a book so that the projected image of the material on the book spine is rotated ninety degrees in a first direction. That is, if the information on the book spine is printed from bottom to top it is desirable to rotate the image ninety degrees clockwise, so that the sequence of letters within words printed on the book spine is projected and can be read from left to right Conversely, if the words on the book spine proceed from top to bottom as the book stands on the book shelf, the image rotating device is reversed one hundred eighty degrees in orientation. As a result, the image projected through the reading window of the image rotating device is rotated ninety degrees counterclockwise so that the projected image of the material printed on the book spine is still read from left to right.

A further object of the invention is to provide an image rotating device which is portable and which requires no moving parts and no power source for its basic operation. To the contrary, image rotation is achieved through a series of uniquely oriented and configured mirrors housed within a small, portable case.

The use of the image rotating device is not limited to reading information from book spines on library shelves. Indeed, the device may be employed in any situation in which printed material has been turned on edge and thus cannot be easily read by an individual looking straight ahead. For example, the image rotating device of the invention is useful for reading information from stacked catalogues, information from packages which are turned on their sides, nd in other situations in which objects bearing lettering have been turned on end.

In one broad aspect the present invention is an image rotating device for rotating an image ninety degrees as viewed in a plane defined by first and second axes in an orthogonal coordinate system having first, second and third axes. The image rotating device is comprised of linearly extending first, second and third mirrors disposed relative to each other in the shape of a right isosceles triangle. The first mirror is a planar reflector disposed to extend parallel to the first axis in the orthogonal coordinate system. The first mirror forms a leg of the triangle and is oriented at angles of forty five degrees both to a plane defined by the first and second axes and to a plane defined by the first and third axes. The second mirror is a planar reflector disposed to extend parallel to the second axis to form another leg of the triangle. The second mirror is oriented at angles of forty five degrees both to a plane defined by the first and second axes and to a plane defined by the second and third axes. The third mirror is a dihedral oriented to form the hypotenuse of the triangle having first and second planar reflecting surfaces which intersect each other at right angles at a linear intersection. The linear intersection is parallel to the plane defined by the first and second axes and is oriented at angles of forty five degrees both to a plane defined by the second and third axes and to a plane defined by the first and third axes.

Preferably, all of the mirrors in the image rotating device are held in fixed disposition relative to each other by a confining case. The case is provided with a pair of windows, one of which is disposed adjacent to the first mirror and is coextensive therewith and is parallel to the plane defined by the first and second axes. The other window is disposed adjacent to the second mirror and is coextensive therewith and is likewise parallel to the plane defined by the first and second axes.

In another broad aspect the present invention may be considered to be a device for rotating an image by ninety degrees in a viewing plane which is parallel to first and second axes in a coordinate system of first, second and third orthogonal axes. The device is comprised of a first mirror having first and second extremities and having a planar reflecting surface oriented at an angle of forty five degrees relative to the viewing plane and extending parallel to the first axis. The device is also comprised of a second mirror: having first and second extremities and a planar reflecting surface oriented at an angle of forty five degrees relative to the viewing plane and extending parallel to the second axis and disposed so that the first extremities of both of the first and second mirrors are proximate to each other. The planar reflecting surface of the second mirror is inclined toward the second extremity of the first mirror. The device is further comprised of a third mirror extending between the second extremities of the first and second mirrors. The third mirror is formed as a dihedral with first and second faces mutually oriented at right angles relative to each other. Both the first and second faces of the dihedral are oriented at equal angles relative to a plane defined by the second and third axes and both of said faces are oriented at the same equal angles relative to a plane defined by the first and third axes. As a result, an image extending parallel to the first axis as viewed in the viewing plane by the first mirror is rotated and projected as an image parallel to the second axis as viewed in the second mirror.

Preferably, the image rotating device is further comprised of a casing which contains the mirrors and which holds the mirrors in fixed orientation relative to each other. The casing defines a first window parallel to the viewing plane and coextensive with and in optical communication with the first mirror and a second window parallel to the viewing plane and coextensive with and in optical communication with the second mirror.

The invention may be described with greater clarity and particularity by reference to the accompanying drawings.

DESCRIPTION OF THE DRAWINGS

FIG. 1 is a perspective diagram illustrating a three dimensional orthogonal coordinate system having first, second and third orthogonal axes.

FIG. 2 is a perspective view of an embodiment of an image rotating device according to the invention as viewed with reference to the orthogonal coordinate system of FIG. 1.

FIG. 3 is a front elevational view of the image rotating device of FIG. 2.

FIG. 4 is a rear elevational view of the image rotating device of FIG. 2.

FIG. 5 is an isolated plan view of the underside of the dihedral shaped mirror illustrated in FIG. 3.

FIG. 6 is a sectional detail taken along the lines 6—6 of FIG. 5.

FIG. 7 is a top plan diagram illustrating the mirror orientation and the operation of the image rotating device of FIG. 2.

FIG. 8 is an elevational view taken along the lines 8—8 of FIG. 7.

FIG. 9 is an end elevational view taken along the lines 9—9 of FIG. 7.

DESCRIPTION OF THE EMBODIMENT

FIG. 1 is a diagram illustrating a three dimensional coordinate system with reference to which the orientation of the various mirrors in the image rotating device may be described and defined. The coordinate system of FIG. 1 includes a first Y axis, a second X axis, and a third Z axis. The X, Y and Z axes are all mutually perpendicular to each other. The X, Y and Z axes depicted in FIG. 1 meet at a point of origin labeled O.

The X and Y axes together define a plane which with reference to the coordinate system of FIG. 1, may be considered to be a vertical plane and is hereinafter designated the XY plane. The XY plane is the plane defined by the first or Y axis and the second or X axis. Similarly, the second or X axis and the third or Z axis define a plane, with reference to FIG. 1, which may be considered to be a horizontal plane and which is hereinafter designated as the XZ plane. The XZ plane is perpendicular to the XY plane. The first or Y axis and the third or Z axis define another plane perpendicular to both the XY plane and to the XZ plane and which is hereinafter designated as the YZ plane. The YZ plane may be considered to be in a vertical plane, as viewed in FIG. 1.

The X, Y and Z axes have also been indicated in FIG. 2. While the relative directions of the X, Y and Z axes are hereinafter utilized to describe and define the orientation of the mirrors within the image rotating device depicted in FIG. 2, the point of origin O in FIG. 1 is not relevant to this description and definition.

FIGS. 2, 3 and 4 illustrate an image rotating assembly 10 which is comprised of a plastic case 12, a first mirror 14, a second mirror 16 and a third mirror 18. The plastic case 12 is depicted in phantom in FIG. 2 and is omitted entirely from the diagrams of FIGS. 7, 8 and 9 in order to clarify the explanation of the construction and orientation of the first, second and third mirrors 14, 16 and 18, respectively.

The image rotating assembly 10 is configured to project an image of an object extending parallel to the first Y axis in the orthogonal coordinate system of FIG. 1 as an image extending parallel to the second X axis in that same coordinate system. The first mirror 14, the second mirror 16 and the third mirror 18 are arranged end to end to form a right, isosceles triangular configuration, as depicted in FIGS. 2 and 8.

The first mirror 14 is a planar reflector extending as one leg in the isosceles right triangular configuration depicted in FIGS. 2 and 8. The first mirror 14 extends parallel to the first Y axis and is oriented at an angle of forty five degrees relative to both the XY plane and to the YZ plane. That is, with reference to FIGS. 2 and 8, the mirror 14 is oriented at an angle of forty five degrees relative to the XY plane and at an angle of forty five degrees relative to the YZ plane, as also illustrated in FIG. 7.

The second mirror 16 of the image rotating device 10 is also a planar reflector and extends as the other leg in the isosceles right triangular configuration parallel to the second X axis. The second mirror 16 is oriented at an angle of forty five degrees relative both to the XY plane and to the XZ plane, as best depicted in FIG. 9.

The third mirror 18 extends as the hypotenuse of the isosceles right triangular configuration and is formed as a dihedral having first and second reflective faces 20 and 22 which intersect in a straight line 24 and which are oriented at ninety degrees relative to each other, as best depicted in FIGS. 2 and 6.

The third mirror 18 is formed of a pair of elongated, trapezoidal elements 36 and 38 which are cemented together at right angles relative to each other. The element 36 is slightly wider than the element 36 since it overlaps the end of the element 36 where those elements meet, as illustrated in FIG. 6. The reflective faces 20 and 22 are thereby formed of equal width in mirror image shape. Together the third mirror elements 36 and 38 form a tent shaped structure extending longitudinally at an inclination of forty five degrees relative to both the XZ and YZ planes. The reflective surfaces 20 and 22 obliquely face the reflective surfaces of both the first mirror 14 and the second mirror 16.

The straight line 24 of the dihedral intersection is parallel to the XY plane, as depicted in FIG. 7 and is oriented at angles of forty five degrees relative to both the XZ plane and the YZ planes, as best depicted in FIG. 8. The first and second reflective faces 20 and 22 of the dihedral shaped mirror 18 are inclined equally relative to the XZ plane and to the YZ plane. That is, the planar surface formed by the first reflective face 20 of the third mirror 18 resides at the same angle relative to the XZ plane as does the second reflective face 22. Similarly, the first reflective face 20 of the third mirror 18 resides at the same angle relative to the YZ plane as does the second reflective face 22. As previously noted, the line of intersection 24 of the reflective faces 20 and 22 resides at an angle of forty five degrees relative to both the XZ plane and the YZ plane.

The first mirror 14 is of an elongated rectangular configuration having a first extremity 26 and a second extremity 28. The length of the mirror 14 may, for example, be about 11.750 inches and the width of the mirror 14 may be about 2.828 inches. The mirror 14 can be constructed of commercial polished plastic or glass. Likewise, the second mirror 16 is an elongated rectangular structure having the same dimensions as the first mirror 14 and having a first extremity 30 and a second extremity 32.

As best illustrated in FIGS. 2 and 8, the first extremities 26 and 30 of both the first mirror 14 and the second mirror 16 are located proximate to each other and the planar reflecting surface of the second mirror 16 is inclined upwardly toward the second extremity 28 of the first mirror 14, as best depicted in FIGS. 2 and 9. The vertical distance between the upper edge of the upper extremity 28 of the first mirror 14 and the uppermost longitudinal edge of the second mirror 16 is indicated at 34 in FIG. 7 and may be a distance equal to 9.750 inches. This distance represent the length of the effective clear viewing aperture of the image rotating device 10.

As previously noted, the mirrors 14, 16 and 18 are held in rigid orientation relative to each other within a plastic casing 12 which is indicated in phantom lines in FIG. 2. The case 12 is shaped in the form of a trapezoidal prism having a short edge 52 parallel to a longer edge 54. The case 12 has a front side 40, visible in FIG. 3, and a back side 42, visible in FIG. 4. The front and back sides 40 and 42 are both parallel to the viewing plane, which is parallel to the XY plane. The back side 42 includes a window 44 which is coextensive with and in optical communication with the reflective surface of the first mirror 14. The window 44 is vertically oriented with respect to the orthogonal coordinate system depicted in the drawings. Similarly, an elongated window 46 is defined in the front side 40 of the case 12 and is coextensive with and in optical communication with the second mirror 16. The mirror 46 extends with its longest dimension disposed horizontally, as viewed in the orthogonal coordinate system depicted in the drawings. Both the window 44 and the window 46 are clear, transparent glass or plastic.

When the image rotating device 10 is disposed in the orientation depicted in FIG. 2 the window 44 can be positioned in registration with a vertical line of printing which begins in registration with the top of the case 12 and proceeds toward the bottom. When the image rotating device 10 is positioned in this fashion letters of words printed from the top to the bottom of a spine of a book can be read from left to right through the window 46 in the casing 12.

To illustrate, the image rotating device 10 is depicted in FIG. 3 laterally displaced from a book 48 bearing the title "RARE GEMS" on its spine. This title is printed along the spine of the book 48 from the upper portion thereof to the lower portion when the book 48 is vertically oriented as illustrated in FIG. 3. If the image rotating device 10 is moved laterally to the left of the position in which it is depicted in FIG. 3 so that the spine of the book 48 is in registration with the vertically oriented window 44 in the back side 42 of the case 12, as depicted in FIG. 7, the image of the title "RARE GEMS" will be rotated ninety degrees counterclockwise, with reference to FIG. 3, whereupon it can be read from left to right in the window 46.

Words on the spines of some books are printed in exactly the opposite manner, however. For example, the title "TRAVEL GUIDE" of the book 50 is printed on the spine of the book 50 with the letters of the title proceeding from bottom to top. However, the device of the invention is versatile and can be utilized to rectify the image of the title of the book 50 as well. To accomplish this, the casing 12 is rotated one hundred eighty degrees s that the positions of the short edge 52 and the long edge 54 thereof are reversed from top to bottom from their positions of FIG. 3. The rounded corner 56 of the casing 12 will thereupon extend to the upper left rather than to the lower right as depicted in FIG. 3.

When the casing 12 is turned on hundred eighty degrees in the plane of drawing FIG. 3, the title "TRAVEL GUIDE" of the book 50 will appear in the window 46 and can be read from left to right in the conventional fashion when the window 44 is disposed in facing registration with the spine of the book 50. The image of the title of the book 50 is thereby rotated ninety degrees clockwise. Thus, the image rotating device 10 can be utilized to rotate images ninety degrees in either a clockwise or counterclockwise direction.

The manner in which image rotation occurs may be best explained with reference to FIGS. 7, 8 and 9. To simplify the explanation of image reflection in those drawing figures, all of the mirrors 14, 16 and 18 have been illustrated as being planar structures without thickness, but having length and breadth.

With the image rotating device 10 oriented in the manner depicted in FIG. 3 and disposed in registration with the spine of the book 48, the image of the lower left corner of the spine of a book, such as the book 48, will appear in the lower right hand corner of the window 46. The image of the lower right hand corner of the book 50 will appear in the upper right hand corner of the window 46. An image of the upper left hand corner of the book 48 will appear in the lower left hand corner of the window 46, while an image of the upper right hand corner of the book 48 will appear in the upper left hand corner of the window 46. The manner in which the image is rotated may best be explained with reference to the paths of travel of some of the image beams.

An image beam 60 from the lower left portion of the spine of the book 48 travels through the window 44, and parallel to the Z axis, whereupon it strikes the first reflector 14 and is reflected in a horizontal plane at a ninety degree angle as indicated by the beam 61. The beam 61 travels parallel to the XY plane slightly above and parallel to the second mirror 16 until it reaches the reflecting face 22 of the third mirror 18. Upon striking the reflecting face 22 of the third mirror 18 the beam 61 is reflected laterally, and downwardly as a beam 62 toward the opposite reflecting face 20 of the third mirror 18. Upon striking the reflecting face 20 of the mirror 18, the beam 62 is reflected vertically downwardly as a beam 63, indicated in FIGS. 8 and 9. Upon reaching the second mirror 16, the beam 63 is reflected therefrom outwardly and horizontally parallel to the original beam 60 and parallel to the Z axis.

A second image beam 70 likewise emanates from the lower portion of the binding of a book, but centered between the covers of the book and between the longitudinal edges of the window 44. This beam 70 passes parallel to the Z axis and strikes the first mirror 14, where it is deflected parallel to the X axis and parallel to the second mirror 16 as a reflected light beam 71. The light beam 71 travels in a horizontal path above the center of the second mirror 16 and strikes the third mirror 18 at the intersection 24 of the reflecting faces 20 and 22. The light beam 71 is thereupon reflected vertically downwardly parallel to the Y axis as a beam 72. The beam 72 then strikes the second mirror 16, whereupon it is reflected as a horizontal beam 73 parallel to the Z axis.

An image beam 80 at the upper center of the spine of the book 48 travels parallel to the Z axis and is reflected by the first mirror 18 along a horizontal path 81 until it reaches the third mirror 18 near the upper end thereof. Since the light beam 80 emanated from midway between the covers of the book 48, it is centered within the window 44 so that the reflected beam 81 impinges upon the third mirror 18 at the linear intersection 24 of the reflecting faces 20 and 22. The beam 81 is then reflected vertically downwardly as a reflected beam 82 traveling parallel to the Y axis. The beam 82 reaches the second mirror 16 at the first end 30 thereof and is reflected along a horizontal path parallel to the Z axis as a beam 83.

An image beam 90 emanating from near the upper right hand corner of the spine of a book, as viewed in FIG. 3, travels parallel to the Z axis and impinges upon the first mirror 14. The beam 90 is then reflected as a horizontal beam 91 traveling parallel to the X axis until it strikes the reflecting face 20 of the mirror 18 near the upper extremity thereof. The beam 91 is thereupon deflected and travels as a beam 92, obliquely above the second mirror 16 until it reaches the reflecting face 22. The beam 92 is then reflected vertically downwardly as a beam 93 traveling parallel to the Y axis until it reaches the second mirror 16 at the first end 30 thereof. The beam 93 is then reflected in a horizontal path parallel to the Z axis as a reflected beam 94.

With the analysis of the travel of the image beams as indicated, it can be seen that images viewed through the window 46 are rotated ninety degrees counterclockwise from the original orientation looking toward the object upon which they are printed. As previously noted, if the case 12 is turned upside down a clockwise image rotation of ninety degrees will be achieved.

Undoubtedly, numerous variations and modifications of the invention will become readily apparent to those familiar with optical imaging systems. For example, mirror orientations at different angles will produce different angles of image rotation. Accordingly, the scope of the invention should not be construed as limited to the specific embodiment depicted and described herein, but rather is defined in the claims appended hereto.

We claim:

1. An image rotating device for rotating an image ninety degrees as viewed in a plane defined by first and second axes in an orthogonal coordinate system having first, second and third axes comprising linearly extending first, second and third mirrors disposed relative to each other in the shape of a right isosceles triangle, wherein said first mirror is a planar reflector disposed to extend parallel to said first axis to form a leg of said triangle and oriented at angles of forty five degrees both to a plane defined by said first and second axes and to a plane defined by said first and third axes, said second mirror is a planar reflector disposed to extend parallel to said second axis to form another leg of said triangle and oriented at angles of forty five degrees both to a plane defined by said first and second axes and to a plane defined by said second and third axes, and said third mirror is a dihedral oriented to form the hypotenuse of said triangle and having first and second planar reflecting surfaces which intersect each other at right angles at a linear intersection, and said linear intersection is parallel to said plane defined by said first and second axes and is oriented at angles of forty five degrees both to a plane defined by said second and third axes and a plane defined by said first and third axes.

2. A image rotating device according to claim 1 wherein all of said mirrors ar held in fixed disposition relative to each other by a confining case, and said case is provided with a pair of windows, one of which is disposed adjacent to said first mirror and is coextensive therewith and is parallel to said plane defined by said first and second axes and the other of which is disposed adjacent to said second mirror and is coextensive therewith and is likewise parallel to said plane defined by said first and second axes.

3. A device for rotating an image by ninety degrees in a viewing plane which is parallel to first and second axes in a coordinate system of first, second and third orthogonal axes, comprising: a first mirror having first and second extremities and having a planar reflecting surface oriented at an angle of forty five degrees relative to said viewing plane and extending parallel to said first axis, a second mirror having first and second extremities and a planar reflective surface oriented at an angle of forty five degrees relative to said viewing plane and extending parallel to said second axis and disposed so that said first extremities of both of said first and second mirrors are proximate to each other and said planar reflecting surface of said second mirror is inclined toward said second extremity of said first mirror and a third mirror extending between said second extremities of said first and second mirrors and formed as a dihedral with first and second faces mutually oriented at right angles relative to each other and both oriented at equal angles relative to a plane defined by said second and third axes and both oriented at the same equal angles relative to a plane defined by said first and third axes, whereby an image extending parallel to said first axis as viewed in said viewing plane by said first mirror is rotated and projected as an image parallel to said second axis as viewed in said second mirror.

4. A device according to claim 3 further comprising a casing which contains said mirrors and which holds said mirrors in fixed orientation relative to each other and which defines a first window parallel to said viewing plane and coextensive with and in optical communication with said first mirror and a second window parallel to said viewing plane and coextensive with and in optical communication with said second mirror.

5. An image rotating assembly configured to project an image of an object extending parallel to a first axis in an orthogonal coordinate system having first, second and third axes as an image extending parallel t said second axis in said orthogonal coordinate system comprising first, second and third linearly extending mirrors arranged end to end in a right, isosceles triangular configuration, wherein said first mirror is a planar reflector extending as one leg in said right isosceles triangular configuration parallel to said first axis and oriented at an angle of forty five degrees relative to both a plane defined by said first and second axes and a plane defined by said first and third axes, said second mirror is a planar reflector extending as the other leg in said right isosceles triangular configuration parallel to said second axis and oriented at an angle of forty five degrees relative to both a plane defined by said first and second axes and a plane defined by said second and third axes, and said third mirror extends as the hypotenuse of said right isosceles triangular configuration and is formed as a dihedral having first and second reflective faces which intersect in a straight line and which are oriented at ninety degrees relative to each other, and said straight line of said dihedral intersection is parallel to said plane defined by said first and second axes and is oriented at angles of forty five degrees relative to both said plane defined by said second and third axes and said plane defined by said first and third axes, and said first and second reflective faces are both inclined equally relative to said plane defined by said second and third axes and said plane defined by said first and third axes.

6. An image rotating assembly according to claim 5 further comprising a case having front and back sides both parallel to said plane defined by said first and second axes and including a window in said back side coextensive with and in optical communication with said first mirror and a window in said front side coextensive with and in optical communication with said second mirror.

* * * * *